(12) United States Patent
Ichikawa et al.

(10) Patent No.: US 8,057,559 B2
(45) Date of Patent: Nov. 15, 2011

(54) HYDROGEN GENERATOR AND HYDROGENATION APPARATUS

(75) Inventors: Masaru Ichikawa, Tokyo (JP);
Katsumori Tanabe, Hokkaido (JP);
Masashi Sakuramoto, Hokkaido (JP);
Satoru Kikuchi, Ibaraki (JP);
Yukimitsu Mita, Ibaraki (JP)

(73) Assignees: Hrein Energy, Inc., Sapporo-shi (JP);
Masaru Ichikawa, Tokyo (JP)

(*) Notice: Subject to any disclaimer, the term of this patent is extended or adjusted under 35 U.S.C. 154(b) by 672 days.

(21) Appl. No.: 12/281,869

(22) PCT Filed: Jan. 9, 2007

(86) PCT No.: PCT/JP2007/050057
§ 371 (c)(1),
(2), (4) Date: Sep. 5, 2008

(87) PCT Pub. No.: WO2007/102278
PCT Pub. Date: Sep. 13, 2007

(65) Prior Publication Data
US 2009/0025291 A1    Jan. 29, 2009

(30) Foreign Application Priority Data

Mar. 6, 2006 (JP) .................................. 2006-059027

(51) Int. Cl.
*B01J 7/00* (2006.01)
*B01J 19/00* (2006.01)
(52) U.S. Cl. ............ 48/61; 48/127.9; 422/187; 422/198; 422/211; 422/222
(58) Field of Classification Search ........... 48/61, 127.9; 422/187, 198, 211, 222
See application file for complete search history.

(56) References Cited

FOREIGN PATENT DOCUMENTS

| JP | 2004-168631 A | 6/2004 |
|---|---|---|
| JP | 2004-359494 A | 12/2004 |
| JP | 2005-152854 A | 6/2005 |
| JP | 2005-281103 A | 10/2005 |
| JP | 2006-290644 A | * 10/2006 |

OTHER PUBLICATIONS

International Search Report of PCT/JP2007/050057, date of mailing Feb. 13, 2007.

* cited by examiner

*Primary Examiner* — Timothy Vanoy
(74) *Attorney, Agent, or Firm* — Westerman, Hattori, Daniels & Adrian, LLP

(57) ABSTRACT

The efficiency of dehydrogenation and that of hydrogenation are improved. A hydrogen generator for generating hydrogen by dehydrogenation of organic hydrides in the presence of a catalyst is characterized by comprising a reactor vessel (10) of a multi-tubular structure having a region (12) for supplying fuel to generate heat necessary for dehydrogenation, the region containing a combustion catalyst for combusting fuel, and a region (11) containing a dehydrogenation catalyst necessary for dehydrogenation, the regions being arranged radially side by side with a wall separating them. A hydrogenation apparatus which synthesizes organic hydrides by way of hydrogenation of unsaturated hydrocarbons in the presence of a catalyst is characterized by comprising a reactor vessel (10) of a multi-tubular structure having a region (12) for removing the heat generated by hydrogenation and a region (11) containing a hydrogenation catalyst necessary for hydrogenation, the regions being arranged radially side by side with a wall separating them.

9 Claims, 3 Drawing Sheets

US 8,057,559 B2

HYDROGEN GENERATOR AND HYDROGENATION APPARATUS

TECHNICAL FIELD

This invention relates to a hydrogen generator for generating hydrogen by way of dehydrogenation of organic hydrides and a hydrogenation apparatus for storing hydrogen by synthesizing organic hydrides by way of hydrogenation of unsaturated hydrocarbons.

BACKGROUND ART

Hydrogen energy has been attracting attention in recent years from the viewpoint of minimizing the air pollution and the global warming that arise due to consumption of fossil fuel and reducing the risk of radiation exposure due to utilization of atomic energy. Since hydrogen can be generated by electrolysis of water, it can safely be said that hydrogen exists almost inexhaustibly on earth. Also, it is a clean energy source that does not give off any carbon dioxide when combusted. This is a main reason why hydrogen attracts attention.

Meanwhile, hydrogen needs to be stored safely and efficiently for the utilization of hydrogen. Known currently commercially available hydrogen storing methods include a method of putting hydrogen into a high pressure tank and hermetically sealing the tank, a method of storing hydrogen in the inside of hydrogen storage alloys and a method of storing hydrogen as liquid hydrogen.

However, the above listed hydrogen storing methods are hardly commercially feasible for utilizing hydrogen as energy source because they involve problems such as that they require a huge amount of money as capital investment and that they provide only a poor hydrogen storing capacity.

On the other hand, benzene and cyclohexane are known as cyclic hydrocarbon compounds having a same number of carbon atoms. While benzene is an unsaturated hydrocarbon compound partially having double bonds for bonding carbon atoms, cyclohexane is a saturated hydrocarbon compound having no double bond for bonding carbon atoms. For this reason, cyclohexane is obtained by adding hydrogen to benzene, whereas benzene is obtained by removing part of the hydrogen atoms of cyclohexane. Similarly, decalin is obtained by hydrogenation of naphthalene, whereas naphthalene is obtained by dehydrogenation of decalin. Organic compounds such as saturated hydrocarbon compounds that can externally supply hydrogen by way of dehydrogenation are referred to as "organic hydrides" hereinafter. Thus, hydrogen can be stored and supplied by utilizing hydrogenation and dehydrogenation of hydrocarbon compounds. Such techniques for storing and supplying hydrogen are expected in the field of providing automobiles with motive power and also in the field of power generation (refer to, e.g., Patent Document 1)

Patent Document 1: JP 2002-187702 A (abstract and so on)

DISCLOSURE OF THE INVENTION

Problem to be Solved by the Invention

However, the efficiency of dehydrogenation and that of hydrogenation between organic hydrides such as cyclohexane and decalin and unsaturated hydrocarbons such as benzene and naphthalene and also the efficiency of storing and supplying hydrogen need to be improved to make supply and storage of hydrogen using any of these techniques commercially feasible. Particularly, energy necessary for dehydrogenation and energy obtained by hydrogenation need to be utilized very efficiently.

In view of the above-identified problems, it is therefore the object of the present invention to improve the efficiency of dehydrogenation and that of hydrogenation.

Means for Solving the Problem

In an aspect of the present invention, the above object is achieved by providing a hydrogen generator for generating hydrogen by dehydrogenation of organic hydrides in the presence of a catalyst, characterized by comprising a reactor vessel of a multi-tubular structure having a region for supplying fuel to generate heat necessary for dehydrogenation, the region containing a combustion catalyst for combusting fuel, and a region containing a dehydrogenation catalyst necessary for dehydrogenation, the regions being arranged radially side by side with a wall separating them. Dehydrogenation of organic hydrides is an endothermic reaction that requires heat to be supplied at a high rate and energy can hardly be supplied at rate required for the reaction by an ordinary packing type reaction vessel. However, a hydrogen generator according to the present invention directly transmits the energy generated by combusting fuel to the dehydrogenation catalyst in the region other than the region containing the combustion catalyst to realize a high efficiency of utilization of energy and, additionally, a high hydrogen generation rate.

Preferably, in a hydrogen generator according to the present invention, at least either the combustion catalyst or the dehydrogenation catalyst is supported on the wall surface in the reactor vessel. With this arrangement, heat is transmitted directly from the combustion catalyst through the wall surface so further raise the hydrogen generation rate.

Preferably, in a hydrogen generator according to the present invention, the wall surface is that of a fin-shaped, pleated, lattice-shaped or honeycomb-shaped member. With this arrangement, the wall surface supporting the catalyst shows an increased surface area per unit volume to further raise the hydrogen generation rate.

Preferably, in a hydrogen generator according to the present invention, at least either the combustion catalyst or the dehydrogenation catalyst is supported by an aluminum compound by way of an anodic oxidation process. With this arrangement, the catalyst can be supported so as to realize a high thermal conductivity. Additionally, heat can be transmitted quickly to the endothermic region by using aluminum, which is an excellent thermal conductor, for the wall surface or the fins of each of the regions.

Preferably, in a hydrogen generator according to the present invention, the dehydrogenation product is used as fuel. With this arrangement, the rate at which fuel is supplied externally can be minimized or nullified so that a self-sufficient hydrogen generation system can be realized by utilizing the reaction product of the source materials.

In another aspect of the present invention, there is provided a hydrogenation apparatus for storing hydrogen by synthesizing organic hydrides by way of hydrogenation of unsaturated hydrocarbons in the presence of a catalyst, characterized by comprising a reactor vessel of a multi-tubular structure having a region for removing the heat generated by hydrogenation and a region containing a hydrogenation catalyst necessary for hydrogenation, the regions being arranged radially side by side with a wall separating them. Hydrogenation of unsaturated hydrocarbons for storing hydrogen is an exothermic reaction that gives off heat at a high rate and, at the same time, an equilibrium reaction so that the rate of reaction falls as the temperature rises. However, a hydrogenation apparatus according to the present invention can control the rise of the reaction temperature and improve the efficiency of hydrogenation so that the hydrogenation rate can be remarkably boosted.

Preferably, in a hydrogenation apparatus according to the present invention, the hydrogenation catalyst is supported on the wall surface in the reactor vessel. With this arrangement, the heat generated by hydrogenation through the wall surface can be immediately removed to further raise the rate of hydrogenation.

Preferably, in a hydrogenation apparatus according to the present invention, the wall surface is that of a fin-shaped, pleated, lattice-shaped or honeycomb-shaped member. With this arrangement, the wall surface supporting the catalyst shows an increased surface area per unit volume to further raise the rate of hydrogenation.

Preferably, in a hydrogenation apparatus according to the present invention, the hydrogenation catalyst is supported by an aluminum compound by way of an anodic oxidation process. With this arrangement, the catalyst can be supported so as to realize a high thermal conductivity. Additionally, heat can be transmitted quickly from one of the regions to the other by using aluminum, which is an excellent thermal conductor, for the wall surface or the fins of each of the regions.

Advantage of the Invention

Thus, according to the present invention, the efficiency of dehydrogenation or hydrogenation can be improved and, at the same time, the overall energy efficiency can be raised.

EXPLANATION OF REFERENCE SYMBOLS

1: hydrogen generator
10: reactor vessel
11: outer region (region)
12: inner region (region)
17: fin
18: fin
40: hydrogenation apparatus

BEST MODE FOR CARRYING OUT THE INVENTION (1. Hydrogen Generator)

Now, a preferable embodiment of hydrogen generator according to the present invention will be described in detail by referring to the accompanying drawings.

Firstly, dehydrogenation that takes place in a hydrogen generator according to the present invention will be briefly described. The three reaction formulas shown below are typical formulas of dehydrogenation of organic hydrides. As seen from the reaction formulas, unsaturated hydrocarbons are generated as hydrogen is eliminated from organic hydrides.

$C_{10}H_{18} \rightarrow C_{10}H_8 + 5H_2 - 333.4$ kJ/mol (dehydrogenation of decalin)

$C_6H_{12} \rightarrow C_6H_6 + 3H_2 - 205.9$ kJ/mol (dehydrogenation of cyclohexane)

$C_7H_{14} \rightarrow C_7H_8 + 3H_2 - 204.8$ kJ/mol (dehydrogenation of methylcyclohexane)

A hydrogen generator can be realized by utilizing compounds such as organic hydrides part or all of the bonds of which is turned to double bonds or triple bonds to give off hydrogen to the outside.

Figure 1:
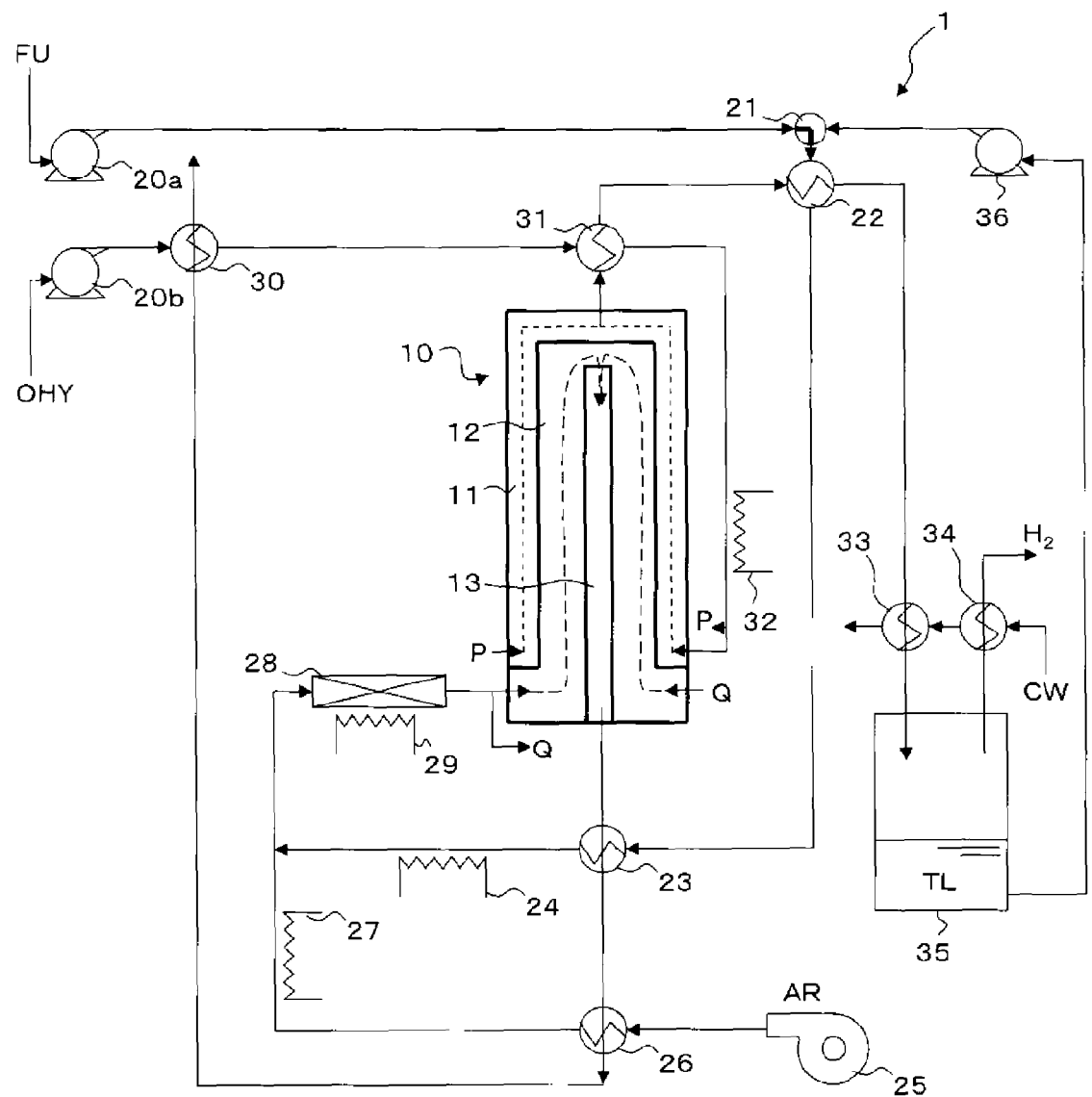
FIG. 1 is a schematic illustration of a preferable embodiment of hydrogen generator according to the present invention.

FIG. 1 is a schematic illustration of a preferable embodiment of hydrogen generator according to the present invention. FIG. 1 shows only an embodiment of hydrogen generator according to the present invention and the present invention is by no means limited thereto.

The hydrogen generator 1 of this embodiment has a reactor vessel 10 that provides a site of dehydrogenation of methylcyclohexane (indicated by "OHY" in FIG. 1), which is an organic hydride. The reactor vessel 10 shows an oblong cylindrical profile. It is a triple-tubular structure formed by radially arranging three tubes. The innermost tube of the reactor vessel 10 is a channel 13 for exhaust gas produced as a mixture of fuel (indicated by "FU" in FIG. 1) and air is combusted. Fuel that can be used for the purpose of the present invention includes city gas, LPG and kerosene. Both the upstream end and the downstream end of the channel 13 are open to form so many apertures. Exhaust gas flows through the channel 13 from upstream to downstream and is discharged from the reactor vessel 10.

Another tube having a diameter greater than the channel 13 is arranged radially outside the channel 13. The region defined by the tube and the outer wall surface of the channel 13 is a region 12 where a mixture of fuel and air is introduced and combusted (to be referred to as "inner region" in this embodiment). The inner region 12 held in communication with a lower part of the lateral wall of the reactor vessel 10 and the upstream end aperture of the channel 13. The reactor vessel 10 is provided at the lower part of the lateral wall thereof with one or more than one openings that are held in communication with the inner region 12. While two openings are shown in FIG. 1, a single opening or three or more than three openings may alternatively be provided. Fuel and air enter the inner region 12 through the lower part of the lateral wall of the reactor vessel 10 and consumed for combustion there. The exhaust gas produced as a result of the combustion is made to enter the channel 13 from the upstream end thereof and flow to the outside of the reactor vessel 10.

A tube that also operates as the outer wall of the reactor vessel 10 is arranged outside the inner region 12. The region defined by the inner wall of the tube and the outer wall of the tube that defines the inner region is a region 11 where toluene (indicated by "TL" in FIG. 1) and hydrogen are generated by dehydrogenation of methylcyclohexane (to be referred to as "outer region" in this embodiment). The outer region 11 is held in communication with a lower part of the lateral wall and the top wall of the reactor vessel 10. The reactor vessel 10 is provided at the lower part of the lateral wall thereof with one or more than one openings that are held in communication with the outer region 11. While two openings are shown in FIG. 1, a single opening or three or more than three openings may alternatively be provided. Methylcyclohexane enters the outer region 11 from the lower part of the lateral wall of the reactor vessel 10 and is dehydrogenated there.

Toluene and hydrogen generated by dehydrogenation flow toward the upstream end of the outer region 11 and are discharged to the outside from the top end of the reactor vessel 10. The structure of the reactor vessel 10 will be described in greater detail hereinafter.

The thermal energy necessary for the dehydrogenation in the reactor vessel 10 is obtained by heating fuel and supply it to the combustion catalyst. Fuel is fed by a pump 20*a* to a flow path changeover valve 21, a heat exchanger 22 and another heat exchanger 23 and subsequently heated by an electric heater 24, which is one of a number of heating means. Air to be mixed with fuel (to be referred to simply as air hereinafter and indicated by "AR" in FIG. 1) is fed to a heat exchanger 26 and heated by an electric heater 27, which is one of a number of heating means, before it is actually mixed with fuel in a mixer 28. The mixer 28 is provided with an electric heater 29, which is one of a number of heating means. Thus, the mixture of fuel and air is sufficiently heated in the mixer 28. The mixture of fuel and air that is mixed by the mixer 28 is then introduced into the inner region 12 in the reactor vessel 10 from the plurality of openings (fuel inlet ports) arranged at a lower part of the lateral wall of the reactor vessel 10. Note that the electric heaters cited above as heating means are operated mainly at the time of starting the operation of the reactor vessel 10 and thermal energy is self sufficient when the reactor vessel 10 is operating in a steady state so that the electric heaters may not necessarily be operated in a steady state.

The heat exchanger 22 provides a site where the mixture of toluene and hydrogen generated by dehydrogenation of methylcyclohexane and fuel exchange heat. Fuel is preliminarily heated as it gets heat from the mixture of toluene and hydrogen. The mixture of toluene and hydrogen, on the other hand, is deprived of heat by fuel and cooled. The heat exchanger 23 provides a site where exhaust gas produced as the mixture of fuel and air is combusted and fuel exchange heat. Fuel is preliminarily heated as it gets heat from exhaust gas. Exhaust gas, on the other hand, is deprived of heat by fuel and cooled. The heat exchanger 26 provides a site where exhaust gas produced as the mixture of fuel and air is combusted and air exchange heat. Air is preliminarily heated as it gets heat from exhaust gas. Exhaust gas, on the other hand, is deprived of heat by air and cooled.

Methylcyclohexane that is dehydrogenated in the reactor vessel 10 is fed by a pump 20*b* to a heat exchanger 30 and another heat exchanger 31. Subsequently, methylcylcohexane is heated by an electric heater 32, which is one of a number of heating means, before it is fed to the outer region 11 from a plurality of openings (source material inlet ports) arranged at a lower part of the lateral wall of the reactor vessel 10.

The heat exchanger 30 provides a site where exhaust gas produced as the mixture of fuel and air is combusted and the source material exchange heat. The source material is preliminarily heated as it gets heat from exhaust gas. Exhaust gas, on the other hand, is deprived of heat by the source material and cooled. Subsequently, exhaust gas is discharged to the outside. The heat exchanger 31 provides a site where the mixture of toluene and hydrogen generated by dehydrogenation of methycyclohexane and the source material exchange heat in the reactor vessel 10. The source material is preliminarily heated as it gets heat from the mixture of toluene and hydrogen. The mixture of toluene and hydrogen, on the other hand, is deprived of heat by the source material and cooled.

The mixture of toluene and hydrogen enters a reaction product container 35, passing sequentially the heat exchanger 31, the heat exchanger 32 and the heat exchanger 33. The hydrogen that enters the reaction product container 35 is then fed to the outside of the reaction product container 35 by way of a heat exchanger 34. The heat exchanger 33 provides a site where the mixture of toluene and hydrogen and cooling water (indicated by "CW" in FIG. 1) exchange heat. The mixture of toluene and hydrogen is deprived of heat by cooling water and cooled before it enters the reaction product container 35. The heat exchanger 34 provides a site where hydrogen and cooling water exchange heat. Hydrogen is deprived of heat by cooling water and cooled before it is delivered to the outside.

The bottom of the reaction product container 35 and pump 36, and the pump 36 and the flow path changeover valve 21 are held in communication with each other so that the toluene in the reaction product container 35 can be fed from the flow path changeover valve 21 to the fuel inlet ports of the reactor vessel 10 by way of the heat exchanger 22, the heat exchanger 23 and the mixer 28. As a result, the toluene obtained by dehydrogenation can be used as fuel. Thus, externally supplied fuel is consumed only in the initial stages of dehydrogenation and subsequently toluene can be used as fuel to realize a hydrogen generation system that shows a high cost performance. In other words, the rate at which fuel necessary for dehydrogenation is supplied externally can be minimized or nullified so that a self-sufficient hydrogen generation system can be realized by utilizing the reaction product of the source materials. The supply of fuel to the reactor vessel 10 from the outside and the supply of toluene to the reactor vessel 10 can be switched by means of the flow path changeover valve 21. Note that the supply of fuel to the reactor vessel 10 from the outside and the supply of toluene to the reactor vessel 10 may not be switched completely and a flow rate regulator may be employed to regulate the ratio of the flow rate of external fuel and that of toluene.

Figure 2:
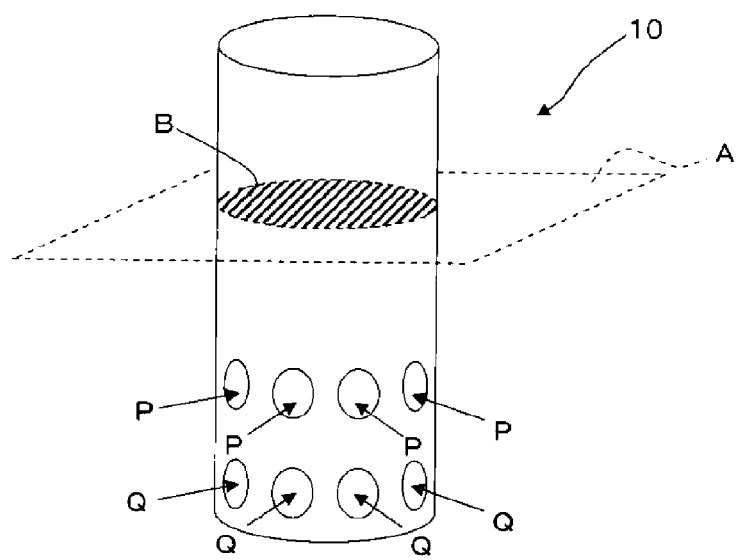
FIG. 2 is a schematic perspective view of the reactor vessel of FIG. 1.
Figure 3:
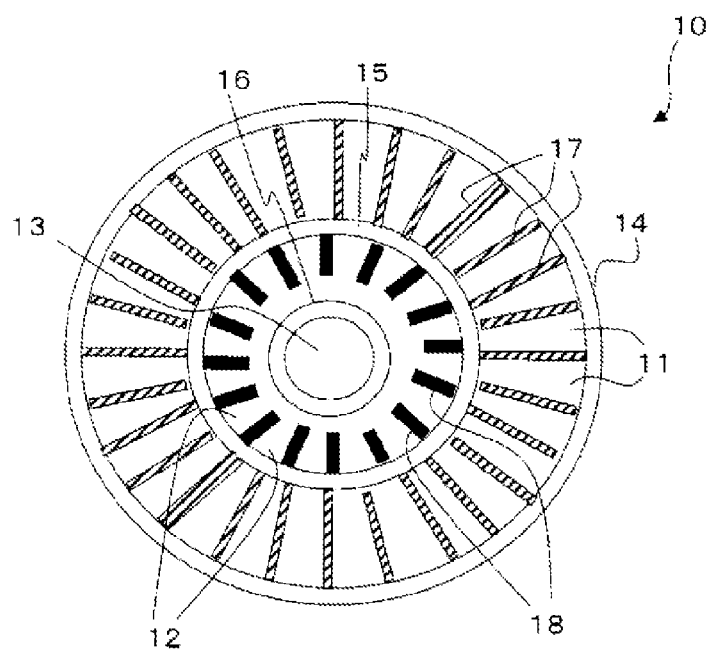
FIG. 3 is a schematic illustration of the cross sectional plane B that is obtained when a cross section of the reactor vessel is taken along plane A.

FIG. 2 is a schematic perspective view of the reactor vessel 10. FIG. 3 is a schematic illustration of the cross sectional plane B that is obtained when a cross section of the reactor vessel 10 is taken along plane A.

As shown in FIG. 3, the reactor vessel 10 is a container of a triple-tubular structure formed by coaxially arranging a tube 14 having the largest diameter and operating as the outer wall of the reactor vessel 10, a tube 15 having a diameter smaller than the tube 14 and a tube 16 having a diameter smaller than the tube 15. The region between the tube 14 and the tube 15 is an external region 11 for generating toluene and hydrogen by dehydrogenation of methylcyclohexane. The outer region 11 is provided with a plurality of fins 17 extending in the direction from the tube 14 toward the tube 15. The region between the tube 15 and the tube 16 is an inner region 12 for introducing the mixture of fuel (which may be toluene) and air. The inner region 12 is provided with a plurality of fins 18 extending in the direction from the tube 15 toward the tube 16.

The fins 17 and the fins 18 are catalyst supports or supports having respective catalyst supports fitted to the outer surface thereof. The catalyst supports are preferably aluminum oxide prepared by way of an anodic oxidation process. A combustion catalyst that is required for burning a mixture of fuel and air is supported on the fins 17. A dehydrogenation catalyst that is required for dehydrogenation of methylcyclohexane is supported on the fins 18. The dehydrogenation catalyst is preferably platinum. A catalyst support made of aluminum oxide is a highly heat-resistant catalyst support. Additionally, since the fins 17 and 18 are made of aluminum that is highly thermally conductive, heat can be quickly transmitted from the inner region 12 to the outer region 11.

As a mixture of fuel and air is combusted by utilizing a combustion catalyst, generated heat is conducted to the fins 17 in the outer region 11 to raise the temperature of the dehydrogenation catalyst supported on the surfaces of the fins 17. Then, methylcyclohexane is dehydrogenated on the surfaces showing a raised temperature to produce toluene and hydrogen. While the temperature of the dehydrogenation catalyst varies depending on the type of organic hydride, it is preferably within a range between about 270 and 400° C., more preferably within a range between about 285 and 370° C. if using methylcyclohexane. As combustion of fuel and dehydrogenation of organic hydride are conducted in the respective regions that are arranged radially side by side (the inner region 12 and the outer region II), the efficiency of dehydrogenation and that of energy utilization are raised to by turn raise the quantity of hydrogen generated per unit time (the hydrogen generation rate).

Catalyst supports having a profile other than fins 17 may be arranged in the outer region 11. For example, pleats may be formed on the surface of the tube 14 or 15 and the dehydrogenation catalyst may be made to be supported on the pleats. Alternatively, a lattice-shaped or honeycomb-shaped member may be arranged in the outer region 11 and the dehydrogenation catalyst may be made to be supported on the wall surfaces of the member. Similarly, pleats may be formed on the surface of the tube 15 or 16 and the combustion catalyst may be made to be supported on the pleats. Alternatively, a lattice-shaped or honeycomb-shaped member may be arranged in the inner region 12 and the combustion catalyst may be made to be supported on the wall surfaces of the member. As described above, when the fins 17, the fins 18, pleats, or a lattice-shaped or honeycomb-shaped member is employed, the area supporting the catalyst per unit volume is raised to by turn raise the reaction efficiency. Similarly, catalyst supports having a profile other than the fins 17 may be arranged in the inner region 12.

As described above, by employing a reactor vessel 10 of a triple-tubular structure having an inner region 12 and an outer region 11 arranged outside the inner region 12 and separated from the inner region 12 by a wall so as to contain a dehydrogenation catalyst necessary for dehydrogenation therein, the dehydrogenation catalyst in the outer region 11 is immediately heated by the heat generated as a result of combustion of fuel to immediately raise the efficiency of dehydrogenation and also the rate of hydrogen generation. Since the combustion catalyst and the dehydrogenation catalyst are supported respectively by the fins 17 and the fins 18 in the reactor vessel 10, heat is conducted directly to the dehydrogenation catalyst by way of the surfaces of the fins 17 and the fins 18 without any gas boundary film resistance. Thus, a very high gas utilization efficiency and a very raised hydrogen generation rate can be realized.

Table 1 below shows some of the results obtained by looking into hydrogen generation rates for different methylcyclohexane supply rates.

TABLE 1

| Source material supply rate (ml/min) | Hydrogen generation rate (NL/min) | Conversion ratio (%) |
|---|---|---|
| 10 | 5.2 | 98 |
| 30 | 13.4 | 85 |
| 40 | 14.3 | 68 |

As seen from Table 1, the hydrogen generation rate is raised when the methylcyclohexane supply rate is raised.

(2. Hydrogenation Apparatus)

Now, a preferable embodiment of hydrogenation apparatus according to the present invention will be described in detail by referring to the accompanying drawings below.

Firstly, hydrogenation that takes place in a hydrogenation apparatus according to the present invention will be briefly described. The three reaction formulas shown below are typical formulas of hydrogenation of unsaturated hydrocarbons. As seen from the reaction formulas, organic hydrides are generated as a result of hydrogenation of unsaturated hydrocarbons. At the same time, large heat generation takes place.

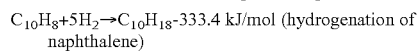
$C_{10}H_8 + 5H_2 \rightarrow C_{10}H_{18}$ -333.4 kJ/mol (hydrogenation of naphthalene)

$C_6H_6 + 3H_2 \rightarrow C_6H_{12}$ -205.9 kJ/mol (hydrogenation of benzene)

$C_7H_8 + 3H_2 \, C_7H_{14}$ -204.8 kJ/mol (hydrogenation of toluene)

Hydrogen can be stored safely by a large quantity by utilizing compounds that can store hydrogen on a molecular level by way of hydrogenation such as unsaturated hydrocarbons.

Figure 4:
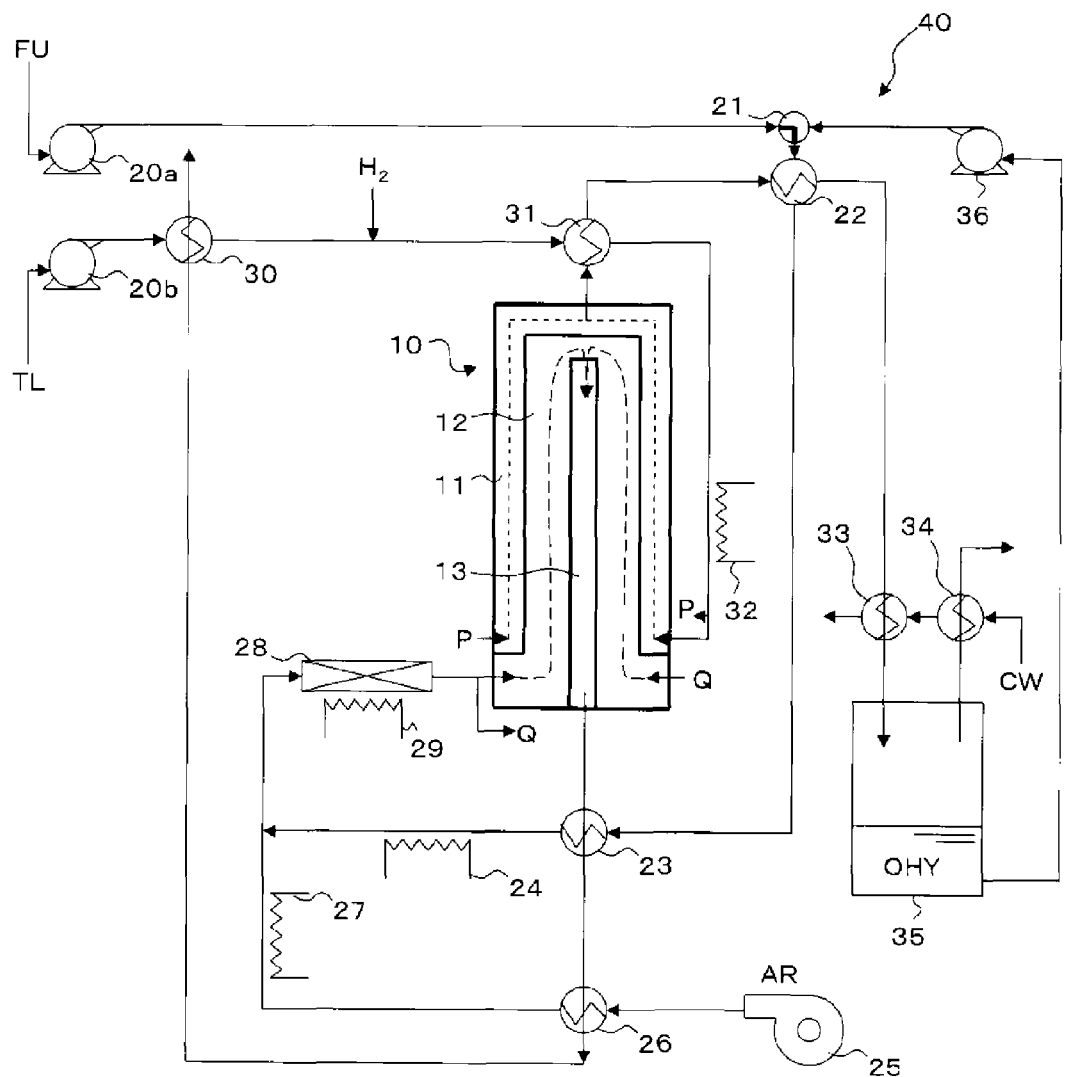
FIG. 4 is a schematic illustration of a preferable embodiment of hydrogenation apparatus according to the present invention.

FIG. 4 is a schematic illustration of a preferable embodiment of hydrogenation apparatus according to the present invention.

The hydrogenation apparatus 40 of this embodiment of the present invention has a reactor vessel 10 that provides a site of hydrogenation of toluene (indicated by "TL" in FIG. 4) that is an unsaturated hydrocarbon. The reactor vessel 10 shows an oblong cylindrical profile and is a triple-tubular structure formed by radially arranging three tubes. The innermost tube of the reactor vessel 10 is a channel 13 for cooling air or cooling water. Both the upstream end and the downstream end of the channel 13 are open to form so many apertures. Heated air or water flows through the channel 13 from upstream to downstream and is discharged from the reactor vessel 10. Toluene is hydrogenated in an outer region 11 of the reactor vessel 10 to become methylcyclohexane (indicated by "OHY" in FIG. 4), which is an organic hydride, and moves to the outside of the reactor vessel 10 to enter a reaction product container 35.

For adding hydrogen to toluene, the temperature of the hydrogenation catalyst in the reactor vessel 10 is preferably heated to a temperature range between 70 and 250° C. Since hydrogenation is an exothermic reaction, hydrogenation is suppressed and conversely dehydrogenation becomes dominant to reduce the ratio of conversion of toluene into methylcyclohexane when the temperature rises above 250° C. Therefore, the temperature of the hydrogenation catalyst is preferably maintained to a temperature range between 70 and 250° C. A more preferable temperature range for the hydrogenation catalyst is between 80 and 200° C.

Since the configuration of the hydrogenation apparatus 40 is similar to that of the above described hydrogen generator 1 and have a large number of components that are common to both of the apparatus, it will not be described here any further.

The hydrogenation apparatus 40 differs from the hydrogen generator 1 mainly in that toluene is mixed with hydrogen before it enters the reactor vessel 10 of the hydrogen apparatus 40 and that the substance discharged from the reaction product container 35 contains surplus hydrogen that has not been consumed by hydrogenation. While toluene and hydrogen are mixed between the heat exchanger 30 and the heat exchanger 31 in the embodiment of FIG. 4, they may alternatively be mixed at a position upstream relative to the heat exchanger 30 or downstream relative to the heat exchanger 31.

By employing a reactor vessel 10 of a triple-tubular structure having an inner region 12 and an outer region 11 arranged outside the inner region 12 and separated from the inner region 12 by a wall so as to contain a hydrogenation catalyst necessary for hydrogenation therein, the generated heat is immediately removed to raise the efficiency of reaction and also the rate of hydrogenation. Additionally, since cooling air (or cooling water) and the hydrogenation catalyst are held in contact with the fins 17 and the fins 18 in the reactor vessel 10, heat can be removed immediately from the hydrogenation catalyst by way of the wall surfaces of the fins 17 and those of the fins 18. Thus, the hydrogenation rate and the conversion ratio can be further improved.

When the fins 17, the fins 18, pleats other than the fins 17 and the fins 18, or a lattice-shaped or honeycomb-shaped member is employed, the cooling area and the area supporting the catalyst per unit volume is raised to by turn raise the reaction efficiency. The catalyst supports made of aluminum oxide are catalyst supports having high heat-resistance. Additionally, since the fins 17 and 18 are made of aluminum that is highly thermally conductive, heat can be quickly transmitted from the inner region 12 to the outer region 11.

While an embodiment of hydrogen generator and an embodiment of hydrogenation apparatus according to the present invention are described above, the present invention is by no means limited to those embodiments, which may be modified and altered in various different ways without departing from the scope of the present invention.

The catalyst supports may be members made of a material such as zirconium oxide or silicon nitride instead of aluminum oxide. Additionally, the catalysts supported by the catalyst supports may be selected from palladium, ruthenium, iridium, rhenium, nickel, molybdenum tungsten, nitenium, vanadium, osmium, chromium, cobalt, iron or a combination of any of these elements instead of platinum.

While the reactor vessel 10 has a triple-tubular structure, it may alternatively have a double-tubular structure, a tetra-tubular structure or some other multi-tubular structure. The inner region may be selected as a region for dehydrogenation or hydrogenation and a region arranged radially side by side relative to the inner region may be formed as outer region. A structure formed by arranging a plurality of reactor vessels in parallel may be employed for the purpose of the present invention.

INDUSTRIAL APPLICABILITY

The present invention can find applications in the industries that consume or store hydrogen.

The invention claimed is:

1. A hydrogen generator for generating hydrogen by dehydrogenation of organic hydrides in the presence of a catalyst, characterized by comprising:
a reactor vessel of a multi-tubular structure having a region for supplying fuel to generate heat necessary for dehydrogenation, the region containing a combustion catalyst for combusting fuel, and a region containing a dehydrogenation catalyst necessary for dehydrogenation, the regions being arranged radially side by side with a wall separating them.

2. The hydrogen generator according to claim 1, characterized in that at least either the combustion catalyst or the dehydrogenation catalyst is supported on the wall surface in the reactor vessel.

3. The hydrogen generator according to claim 2, characterized in that the wall surface is that of a fin-shaped, pleated, lattice-shaped or honeycomb-shaped member.

4. The hydrogen generator according to any one of claims 1 through 3, characterized in that at least either the combustion catalyst or the dehydrogenation catalyst is supported by an aluminum compound by way of an anodic oxidation process.

5. The hydrogen generator according to any one of claims 1 through 3, characterized in that the dehydrogenation product is used as fuel for generating heat necessary for dehydrogenation.

6. A hydrogenation apparatus for storing hydrogen by synthesizing organic hydrides by way of hydrogenation of unsaturated hydrocarbons in the presence of a catalyst, characterized by comprising:
a reactor vessel of a multi-tubular structure having a region for removing the heat generated by hydrogenation and a region containing a hydrogenation catalyst necessary for hydrogenation, the regions being arranged radially side by side with a wall separating them.

7. The apparatus according to claim 6, characterized in that the hydrogenation catalyst is supported on the wall surface in the reactor vessel.

8. The apparatus according to claim 7, characterized in that the wall surface is that of a fin-shaped, pleated, lattice-shaped or honeycomb-shaped member.

9. The apparatus according to any one of claims 6 through 8, characterized in that the hydrogenation catalyst is supported by an aluminum compound by way of an anodic oxidation process.

* * * * *